United States Patent [19]

Ekholm et al.

[11] 4,044,893
[45] Aug. 30, 1977

[54] DEVICE FOR LIFTING PIECES OF LUMBER

[75] Inventors: Rolf Ekholm, Nyland; Hans Danielsson, Ljusne, both of Sweden

[73] Assignee: AB Hammars Mekaniska Verkstad, Nyland, Sweden

[21] Appl. No.: 671,376

[22] Filed: Mar. 29, 1976

[30] Foreign Application Priority Data

June 27, 1975 Sweden .................. 7507383

[51] Int. Cl.² .................. B66F 9/04
[52] U.S. Cl. .................. 214/1 PB; 144/208 B; 214/130 R
[58] Field of Search ........... 214/1 PB, 130 R, 130 A, 214/1 P, 3; 144/208 B, 311

[56] References Cited

U.S. PATENT DOCUMENTS

| | | | |
|---|---|---|---|
| 1,901,360 | 3/1933 | Snow | 214/130 R |
| 2,945,601 | 7/1960 | Evans | 214/1 PB |
| 3,101,757 | 8/1963 | Hanson | 144/208 B X |
| 3,306,472 | 2/1967 | Blanz | 214/1 PB |
| 3,439,816 | 4/1969 | Archambeau et al. | 214/1 PB X |

FOREIGN PATENT DOCUMENTS

| | | | |
|---|---|---|---|
| 101,474 | 4/1941 | Sweden | 144/208 B |

*Primary Examiner*—L. J. Paperner
*Attorney, Agent, or Firm*—Silverman & Cass, Ltd.

[57] ABSTRACT

A lumber lifting device for pieces of lumber transversely fed into the device in an elongate soaking basin. The lifting device has a concave hoisting surface with a front edge which aligns with an inclined ramp below the water level of the basin in a first reception position to receive a piece or pieces of lumber. The lifting device is rotated less than one-half a revolution to a second dumping position above the water level of the basin to discharge the piece or pieces of lumber. A curved stopping surface is connected to the front edge of the hoisting surface to prevent pieces of lumber from interfering with the rotation of the lifting device.

1 Claim, 2 Drawing Figures

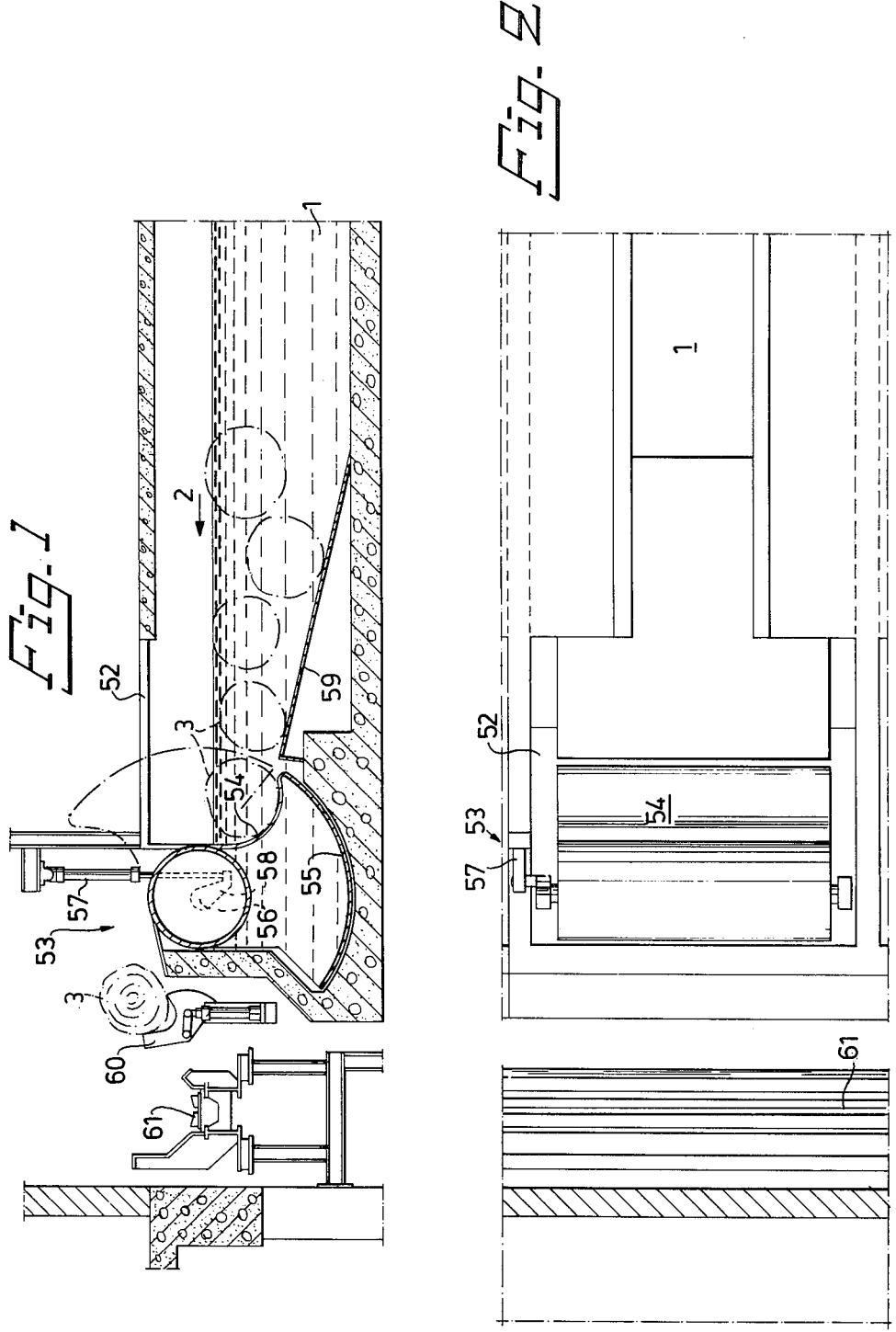

DEVICE FOR LIFTING PIECES OF LUMBER

The present invention relates to a device for lifting pieces of lumber from an elongate soaking basin, in which the pieces of lumber are fed transversely towards the lifting device.

In previously known soaking basins use has been made of a device in the form of a wheel for removing pieces of lumber, the radial arms of the wheel serving to lift the pieces of lumber. The wheel is obliged to rotate in the same direction, the entire device requiring a great deal of space. As the radial arms must be powerfully constructed, the wheel must be heavy as a result, thereby causing a heavy load on its bearings. It is also known that for the transverse removal of pieces of lumber from a water channel use has been made of a grab device, whereby lifting arms, which can be raised or lowered along vertical columns, for lifting the lumber. For this purpose, however, a checking device in coordination with the arms is required to prevent the pieces of lumber coming into contact with the arms when these are being lowered below the level of the lumber before rising to the surface with their load. In consequence, the entire plant with its columns, lifting arms and coordinated checking device is of a complicated nature.

The purpose of the present invention is to produce a device for removing pieces of lumber, which is of stable but at the same time of simple design, is modest with regard to space requirements and is reliable in operation.

This purpose is achieved as follows:

The device for removing pieces of lumber, fed fowards in the longitudinal direction of the basin while remaining in their transverse direction in the basin, has the following characteristics in accordance with the invention. The device comprises a hoisting unit with both a concave hoisting surface and, immediately below the said surface, a stopping device, the said hoisting surface being capable of revolving forwards and backwards to a limited extent, suitably one-quarter of a revolution of a shaft from a reception position, where the hoisting surface and the stopping surface are located below the water level of the basin, where the hoisting device receives the pieces of lumber, to a dumping position, where the hoisting surface is located above the said water level and the pieces of lumber glide or roll off the hoisting surface, while the stopping surface extends below the said water surface, thereby preventing the pieces of lumber from being fed beyond the position where they are to be transferred to the hoisting surface when in the reception position.

The invention is shown in a design in one of the attached drawings as an example.

FIG. 1 shows a vertical longitudinal section through an end part of a basin equipped with a device for removing pieces of lumber in accordance with the invention.

FIG. 2 shows the end part in FIG. 1 seen from above, but with certain details excluded.

The part of a soaking basin shown in the figures comprises part of a basin plant, for example of the type which has an elongate basin, and in the latter, which is referred to as 1, pieces of lumber 3 are fed forwards along the dashed lines, FIG. 1, while remaining in their transverse direction, in the direction indicated by Arrow 2 in the direction of the left end wall of the basin, FIG. 2, where a device for removing lumber 53 in accordance with the present invention is installed. Next to the device for removing lumber 53 the basin 1 is fitted with a lumber discharge opening 52. The device 53 consists of a hoisting unit with a hoisting surface 54 and a stopping surface 55. The hoisting unit 54, 55 is capable of revolving forwards and backwards, suitably one-quarter revolution along a shaft 56 and driven by a hydraulic device 57 coordinated to crankshaft 58. At the side of the device for removing lumber 53 outside the end wall of the basin there is a single piece feeding device 60 and next to this a longitudinal conveyor 61.

When the hoisting device 54, 55 is in the reception position indicated in FIG. 1 by full lines and the hoisting surface 54 as well as the stopping surface 55 are below the water level, the pieces of lumber, which are being fed through basin 1 in the direction shown by Arrow 3, will possibly - via an inclined surface 59 on the bottom of the basin - be moved on to the hoisting surface 54. When, by means of the hydraulic device 57 being turned one-quarter of a revolution, the hoisting device reaches the dumping position shown by dotted lines in FIG. 1, the piece or pieces of lumber, brought up by the hoisting surface 54, is/are removed from the basin and passed to the single piece feeding device 60, which then passes on the pieces of lumber one by one to the longitudinal conveyor 61 for further transport. The stopping surface 55 is continually under water to ensure that the pieces of lumber in the basin are not fed beyond the point where they should be transferred to the hoisting surface 54 when this is in the reception position and also to prevent pieces of lumber from hindering the return of the hoisting surface 54 to its starting position for receiving a fresh load of lumber.

In accordance with the invention, the device for removing pieces of lumber is of simple design, which at the same time is so stable that it can stand up to the loading of pieces of lumber that breakdowns can be avoided, especially thanks to the presence of the stopping surface 55 connected to the hoisting surface and that the space required for the plant is limited because the hoisting unit 54, 55 is only turned forwards and backwards less than one-half of a revolution.

The design described and shown on the drawings can be modified within the scope of the invention. For example, some other power device than the described hydraulic unit can be used for turning the hoisting device forwards and backwards.

What we claim is:

1. A lumber lifting device for removing pieces of lumber which are free floating in a liquid such as water in an elongate soaking basin, which pieces are fed to the lifting device in their transverse direction, said device comprising:

hoisting means including a concave hoisting surface and a stopping surface connected to said hoisting surface on the bottom of a front outter edge of said hoisting surface;

said basin including an upwardly inclined surface extending from the bottom of said basin toward said hoisting means with an upper edge below the water level of said basin adjacent the surfaces of said hoisting means; and means for rotating said hoisting means less than one-half revolution from a first reception position with said hoisting surface outter edge substantially aligned with said upper edge of said inclined surface below the water level of said basin to receive one or more pieces of lumber and a second dumping position with said hoisting surface above the water level to discharge said pieces of lumber and said stopping surface extending below the water level adjacent said upper edge of said inclined surface to prevent pieces of lumber from interfering with the rotation of said hoisting means.

* * * * *